United States Patent [19]

Huang et al.

[11] Patent Number: 5,675,196
[45] Date of Patent: Oct. 7, 1997

[54] HIGH SPEED TEN POLE/TWELVE SLOT D.C. BRUSHLESS MOTOR WITH MINIMIZED NET RADIAL FORCE AND LOW COGGING TORQUE

[75] Inventors: Ben Huang; Albert Hartman, both of Palo Alto, Calif.

[73] Assignee: Quantum Corporation, Milpitas, Calif.

[21] Appl. No.: 560,726

[22] Filed: Nov. 20, 1995

[51] Int. Cl.[6] ............... H02K 7/14; H02K 3/18; H02K 3/28
[52] U.S. Cl. .................... 310/67 R; 310/184
[58] Field of Search .................. 310/67 R, 184, 310/198, 51, 269; 360/98.07, 99.04, 99.08

[56] References Cited

U.S. PATENT DOCUMENTS

| | | | |
|---|---|---|---|
| H1221 | 8/1993 | Best et al. | 360/98.07 |
| 4,752,707 | 6/1988 | Morrill | 310/184 |
| 4,774,428 | 9/1988 | Konecny | 310/198 |
| 4,847,712 | 7/1989 | Crapo | 360/99.08 |
| 5,006,745 | 4/1991 | Nishio et al. | 310/177 |
| 5,164,622 | 11/1992 | Kordik | 310/67 R |
| 5,218,253 | 6/1993 | Morehouse et al. | 310/68 R |
| 5,357,163 | 10/1994 | Minakuchi et al. | 310/90 |
| 5,373,407 | 12/1994 | Stupak, Jr. et al. | 360/99.08 |
| 5,504,637 | 4/1996 | Asada et al. | 360/98.07 |

*Primary Examiner*—Clayton E. LaBalle
*Attorney, Agent, or Firm*—David B. Harrison; Debra A. Chun

[57] ABSTRACT

A ten pole/twelve slot brushless DC motor for a disk drive spindle includes a base; a cylindrical rotor structure rotating relative to the base and a generally symmetrically slotted stator structure fixed about an axis of rotation. The rotor structure includes a permanent magnet ring structure defining ten permanently magnetized alternating north-south magnet segments. The stator structure includes a ferromagnetic core defining twelve stator slots between twelve stator poles. Coils of insulated wire are wound around the stator poles in one of a plurality of disclosed winding patterns and connected into a series of phases, e.g. three phases.

9 Claims, 10 Drawing Sheets

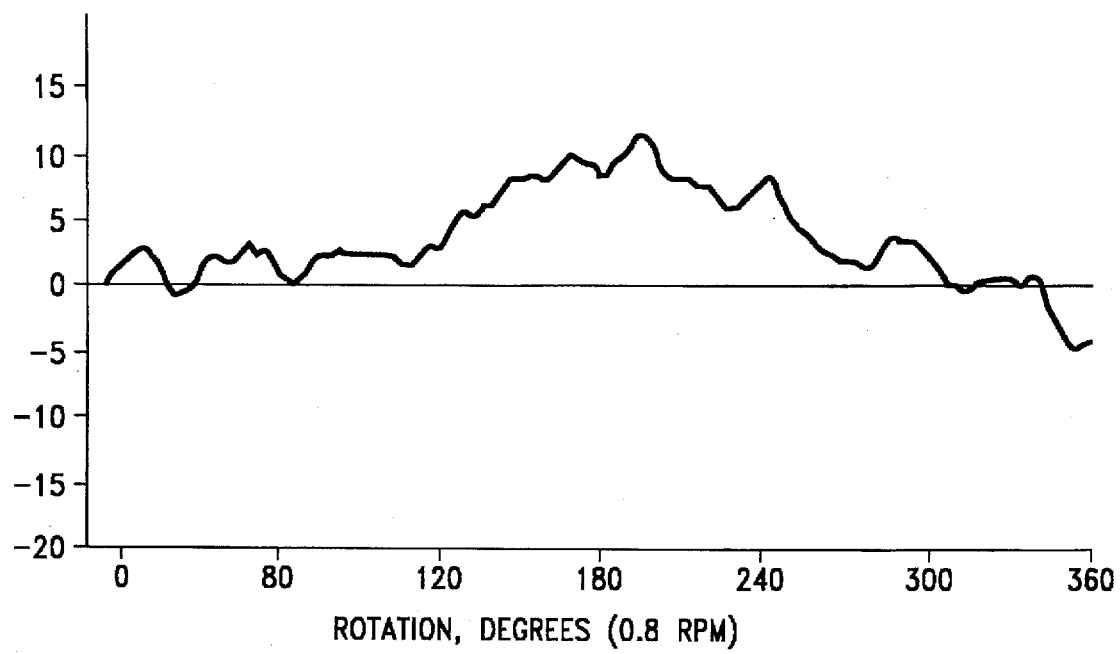
FIG.—1A
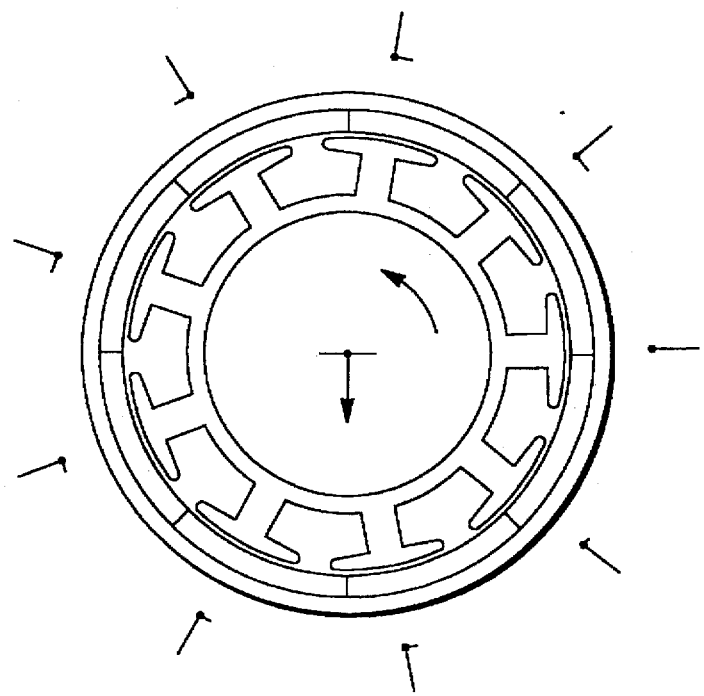
FIG.—1B

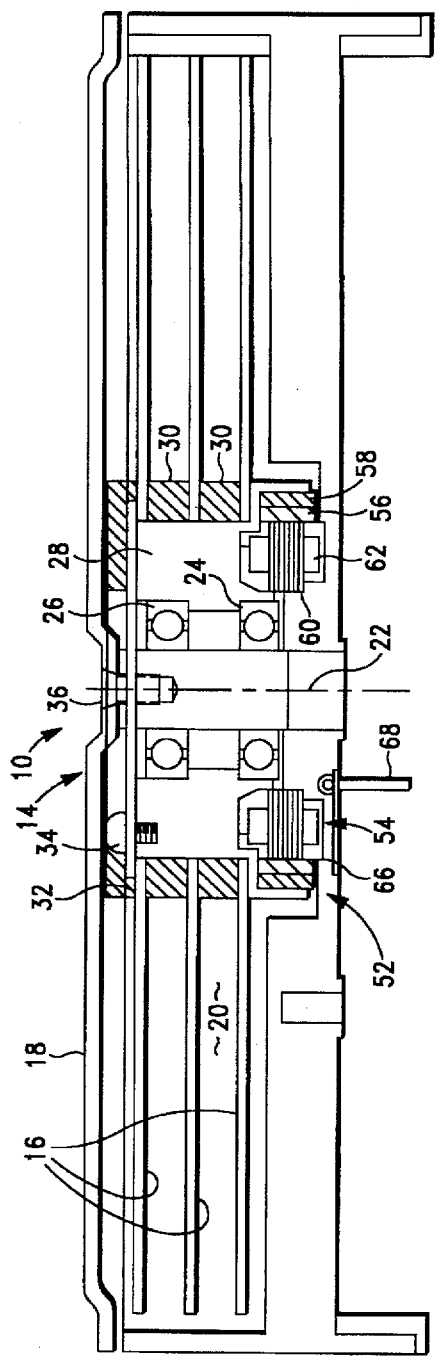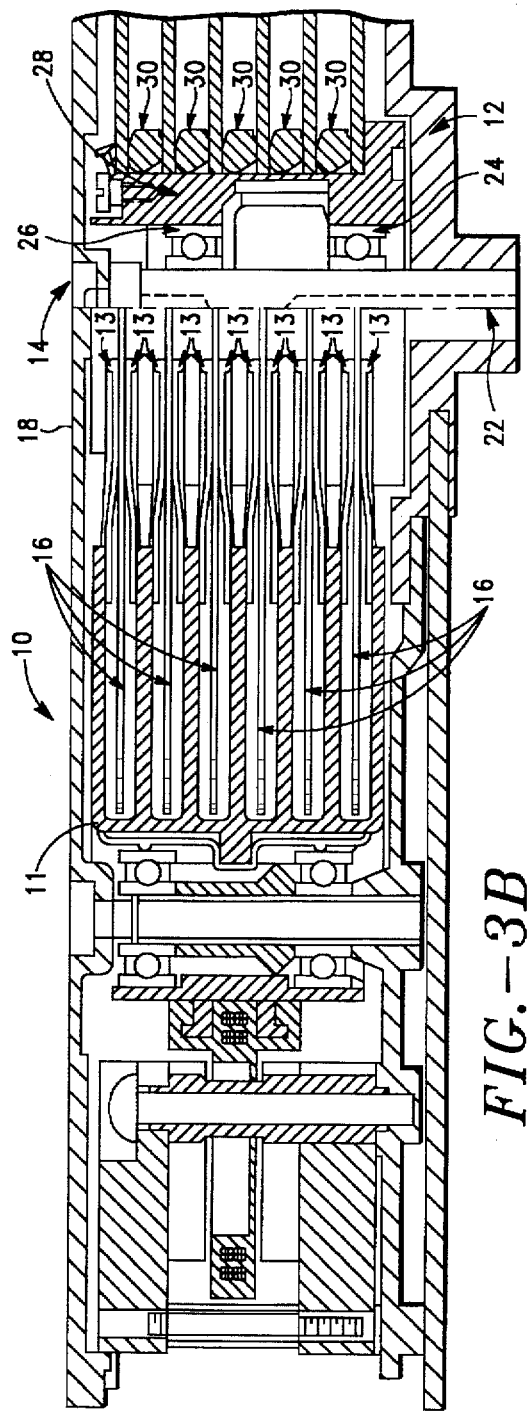

HIGH SPEED TEN POLE/TWELVE SLOT D.C. BRUSHLESS MOTOR WITH MINIMIZED NET RADIAL FORCE AND LOW COGGING TORQUE

FIELD OF THE INVENTION

The present invention relates generally to rotating electrical machinery. More particularly, the present invention relates to a miniature high speed brushless DC motor having a ten pole/twelve slot arrangement with minimized net radial force and low cogging torque.

BACKGROUND OF THE INVENTION

It is known to employ electronically commutated DC brushless motors as direct-drive spindle motors within disk drives. One very popular form of such spindle motor is the so-called eight pole/nine slot spindle motor. This arrangement has been preferred over other arrangements because it has tended to minimize detent or "cogging" torque which becomes manifested by stable rotational positions between the permanent magnet rotor and the stator assembly. In some applications such as positioning head actuators in disk drives, detents provided by incremental positioning step motors have been used to provide precise head positioning. However, for disk drive spindles stable positions result in static forces which must be overcome in addition to normal starting friction forces. Motor detents also become manifested as unwanted vibrations during motor rotation.

In the eight pole/nine slot spindle motor arrangement which has been widely used within the disk drive industry, a permanent magnet annulus is polarized to have eight alternating north-south polar interior faces. These faces directly confront a central stator assembly comprising a laminated stator core defining nine slots or pole piece gaps. Each of the nine pole pieces is wound with a coil of wire, and the coils are typically connected into a series arrangement of three driving phases. In one approach exemplified by Konecny U.S. Pat. No. 4,774,428 for "Compact Three-Phase Permanent Magnet Rotary Machine Having Low Vibration and High Performance", the disclosure thereof being incorporated herein by reference, the winding interconnection patterns provided a high motor efficiency level, but also manifested a high net radial force during operation. This net radial force rotated in synchronism with the rotor and became applied as an unbalancing force to the bearing system, leading to wear of the bearings. Another example of this conventional motor design is provided by Crapo U.S. Pat. No. 4,847,712 for "Disc Drive Spindle Motor with Low Cogging Torque", the disclosure thereof being incorporated herein by reference. The performance of a conventional eight pole/nine slot disk drive spindle motor is shown within the graph of FIG. 1A. This figure illustrates absence of periodic cogging force. FIG. 1B provides a graph of a resultant net radial force extending downwardly in the sense of this plan view from an axis of rotation, based upon a sum of force vectors distributed at each stator polar face (between stator slots) in a conventional eight pole/nine slot motor design. The curved arc in this figure denotes torque force applied by the stator to the rotor. FIG. 1B thus illustrates the problem of net radial force within a conventional eight pole/nine slot spindle motor.

On the other hand, twelve pole/nine slot spindle motor arrangements have also been proposed for hard disk drive spindle rotation applications. An example of this arrangement is found in Morehouse et al. U.S. Pat. No. 5,218,253 for "Spin Motor for a Hard Disk Assembly". This twelve pole/nine slot motor arrangement desirably manifests low net radial force, but it also undesirably manifests detectably high detent forces, which are manifested as thirty six periodic peaks and troughs over one rotational cycle of the motor as shown within the FIG. 2 graph, riding upon a 1 Hz fixturing error offset. When this 1 Hz periodic fixturing error waveform component is backed out of the FIG. 2 graph, it is apparent that the main objection to performance of the twelve pole/nine slot motor is the 36 Hz cogging torque.

While low cogging torque is a deskable property of a disk spindle motor, an equally desirable property is minimization of net radial force during operation. This is particularly true as disk spindles are rotated at ever increasing rotational speeds, approaching and even exceeding ten thousand revolutions per minute (10,000 RPM). With very high rotational speeds, more exotic spindle bearing systems are being proposed, particularly hydrodynamic bearings. These bearings are very sensitive to unbalanced or net radial force and have not worked well with the conventional eight pole, nine slot spindle motor designs discussed above because the net radial forces resulted in stiction or difficulty of startup, and in uneven pumping and eccentric rotation with wear of the shaft and sleeve at the journal bearings during rotational operation of the bearing system.

Thus, a hitherto unsolved need has been for an improved electronically commutated poly-phase spindle motor which manifests low cogging torque and which also manifests low net radial force during operation.

SUMMARY OF THE INVENTION WITH OBJECTS

A general object of the present invention is to provide an electronically commutated DC brushless spindle motor which overcomes the objection of high detent torque present within other symmetric motor designs while simultaneously overcoming the objection of large net radial force associated with asymmetric motor designs.

Another object of the present invention is to provide an electric motor design which achieves very low cogging torque for a variety of magnetizing conditions.

A further object of the present invention is to provide an electric motor design which yields motors achieving smooth operation with varying manufacturing conditions, thereby improving mass production yields and reducing field returns.

One more object of the present invention is to provide an electric motor design adapted for very high rotational speeds, and particularly suitable for use within hydrodynamic spindle bearing systems.

In accordance with principles of the present invention a brushless DC motor includes a base, a cylindrical rotor structure rotating relative to the base about an axis of rotation, and a generally cylindrical stator structure fixed to the base. The rotor structure includes a rotating body journaled to the base by a bearing system and a permanent magnet ring structure carried by the rotating body and defining ten permanently magnetized alternating north-south magnet segments. The stator structure includes a core of e.g. laminated ferromagnetic sheets secured to the base about the axis of rotation and separated inwardly of the permanent magnet ring structure by a magnetic gap, the core defining twelve stator slots between twelve stator poles. A coil of insulated wire is wound around each stator pole in a predetermined winding direction, and the coils are connected into a series of electrical driving phases, in a predetermined connection pattern. The rotating body is rotated about the axis of rotation in response to sequential application of phased driving currents to the series of electrical driving phases. In a preferred example, the motor is a three-phase motor and the coils are connected into three driving phase sets. In one most preferred winding arrangement, the coils are wound about the core in accordance with a sequence A'ABB'C'CAA'B'BCC' wherein A represents coils of one driving phase set, B represents coils of a second driving phase set, and C represents coils a third driving phase set; and, wherein the prime character following a capital letter represents a reverse-direction winding of the coil designated by that letter.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 1A is a graph of torque plotted against a single rotation of a conventional eight pole, nine slot disk drive spindle motor showing low cogging torque and high net radial force.

FIG. 1B is a graph of total forces resulting in an eight pole, nine slot disk drive spindle motor illustrating a high net radial force.

FIG. 3A is a partial diagrammatic side section view of a hard disk drive illustrating a spindle motor incorporating principles of the present invention using a conventional ball bearing spindle system.

FIG. 3B is another partial diagrammatic side section view of a hard disk drive illustrating a spindle motor incorporating principles of the present invention using a conventional ball bearing system and further illustrating a data transducer-actuator assembly.

DETAILED DESCRIPTION OF PREFERRED EMBODIMENTS

Figure 2:
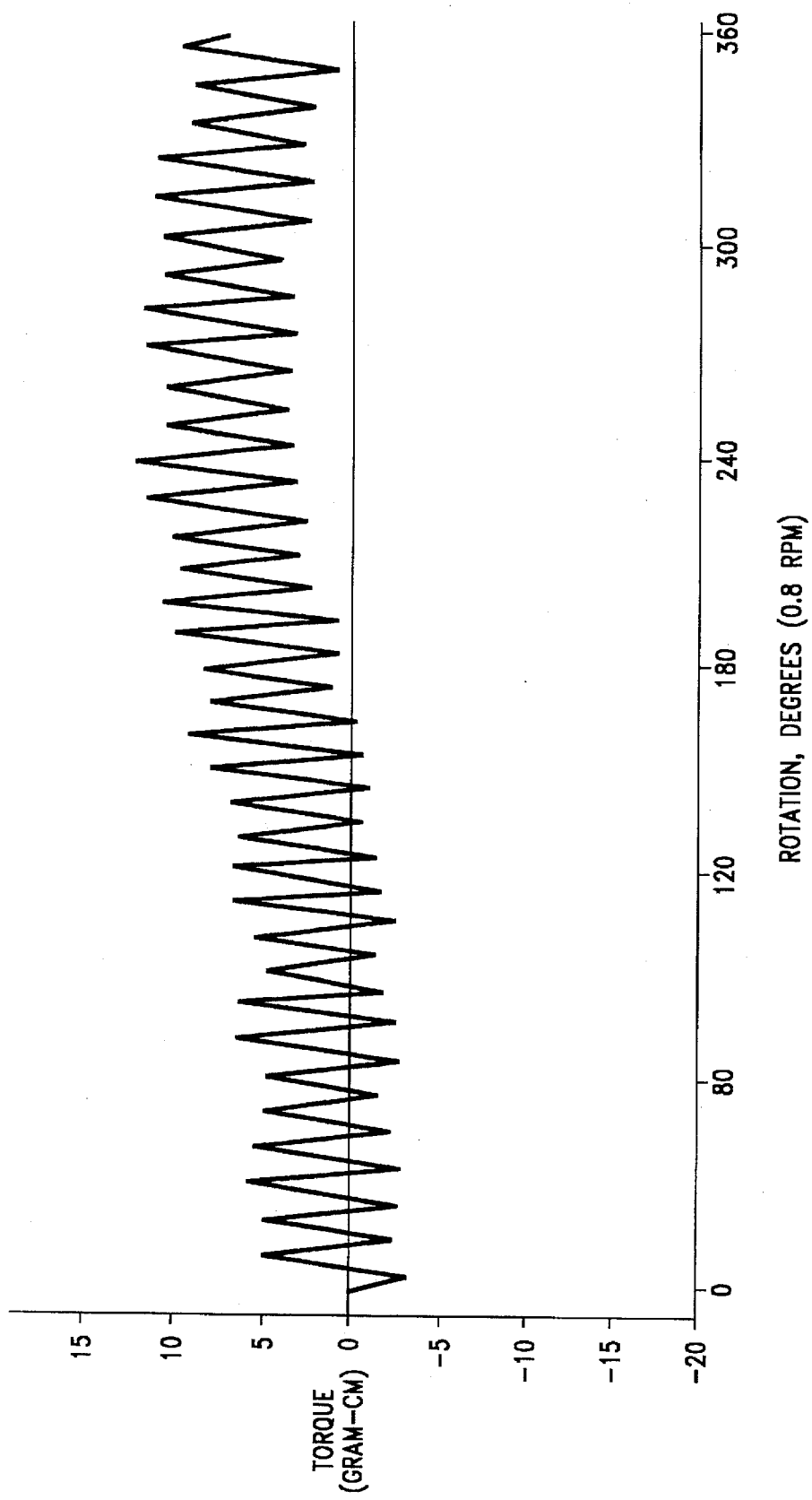
FIG. 2 is a graph of torque plotted against a single rotation of a conventional twelve pole, nine slot disk drive spindle motor showing high cogging torque and low net radial force.

Turning initially to FIG. 3A, a hard disk drive 10 includes a base 12, a spindle assembly 14 mounted to the base, and a plurality of rotating data storage disks 16. A cover 18 is secured by screws (not shown) to a peripheral wall of the base 12 and thereby encloses an interior space 20 including the spindle assembly 14 in a conventional airtight sealing arrangement needed for proper functioning of flying head or "Winchester" disk drive technology. The spindle assembly includes a shaft 22 press fit or affixed by adhesive to the base 12. Two spaced-apart ball bearing units 24 and 26 have inside races secured to the fixed shaft 22 and have outer races secured to a rotating hub 28. Spacers 30 placed between the disks 16 at the hub 28 provide proper planarity and axial alignment of the disks. An annular disk clamp 32 is secured e.g. by screws 34 to the hub 28 and serves to clamp the disks on the hub as a unified stack. To provide additional rigidity to the spindle unit, the fixed shaft 22 may be secured to the top cover by a screw 36. FIG. 3B further illustrates a disk drive 10 including a data transducer-actuator assembly 11 for positioning a data transducer 13 in a transducing relationship relative to storage tracks defined on a data storage surface of a data storage disk 16.

The spindle assembly 14 includes a twelve pole/ten slot direct drive, DC brushless spindle motor 50 incorporating principles of the present invention. The spindle motor 50 includes a rotor structure 52, and a stator structure 54. The rotor structure includes a cylindrical permanent magnet 56 which is secured to a flux return ring 58 formed of ferromagnetic material. The flux return ring 58 may be eliminated in the event that the hub 28 is of ferromagnetic material, although more commonly it is formed of an aluminum alloy. The stator structure 54 includes a ferromagnetic core 60 formed out of e.g. sheet laminations of suitable soft ferromagnetic material. Coils 62 are wound around twelve stator poles defining twelve stator slots and twelve stator pole faces 64. The pole faces 64 are separated from adjacently facing permanent magnet pole segments of the permanent magnet 56 by a narrow magnetic gap 66. A series of connection pins 68 are provided to enable direct connection of the coils 62 to suitable driving circuitry carried on a printed circuit board (not shown) located below a bottom wall of the base 12 in a conventional arrangement not directly pertinent to the present invention. Commutation currents supplied by conventional motor driver circuitry to the sets of coils 62 create electromagnetic fields in the stator, and these fields interact with the fields emanating from the poles of the facing permanent magnet 56 to create reaction torque forces resulting in rotation of the rotor structure 14.

Figure 4:
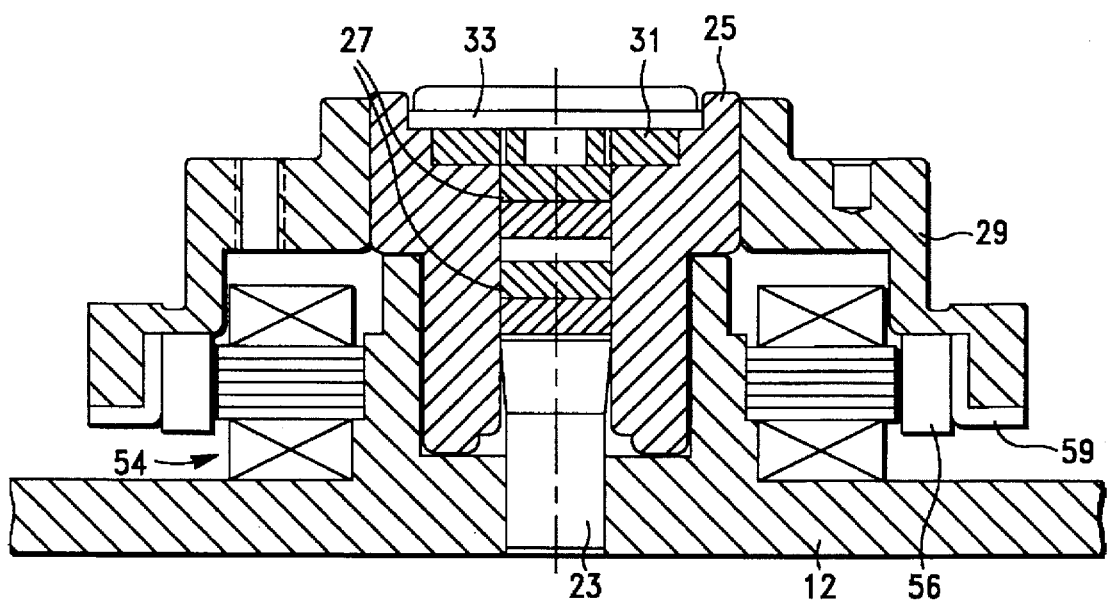
FIG. 4 is a diagrammatic side section view of another hard disk drive illustrating a spindle motor incorporating principles of the present invention within a hydrodynamic bearing spindle system.

In FIG. 4, a similar motor arrangement is provided within a hydrodynamic spindle bearing system, notable differences being the provision of hydrodynamic pumping grooves 27 formed on a central shaft 23 fixed to the base 12 and forming hydrodynamic journal bearings with a sleeve 25. Also a thrust bearing plate 31 provides hydrodynamic thrust bearing surfaces with the sleeve 25 and with a top thrust bearing plate 33. The magnetic flux return ring 58 may include a lower outwardly flanged portion 59 to prevent flux path migration toward the lower data storage surface of the lowest disk 16. Otherwise, the spindle assembly shown in FIG. 4 is substantially equivalent to the spindle assembly 14 depicted in, and discussed above in connection with, FIG. 3; and, the same reference numerals are used in both FIGS. 3 and 4 to refer to common structural elements found in both spindle assemblies.

Figure 5:
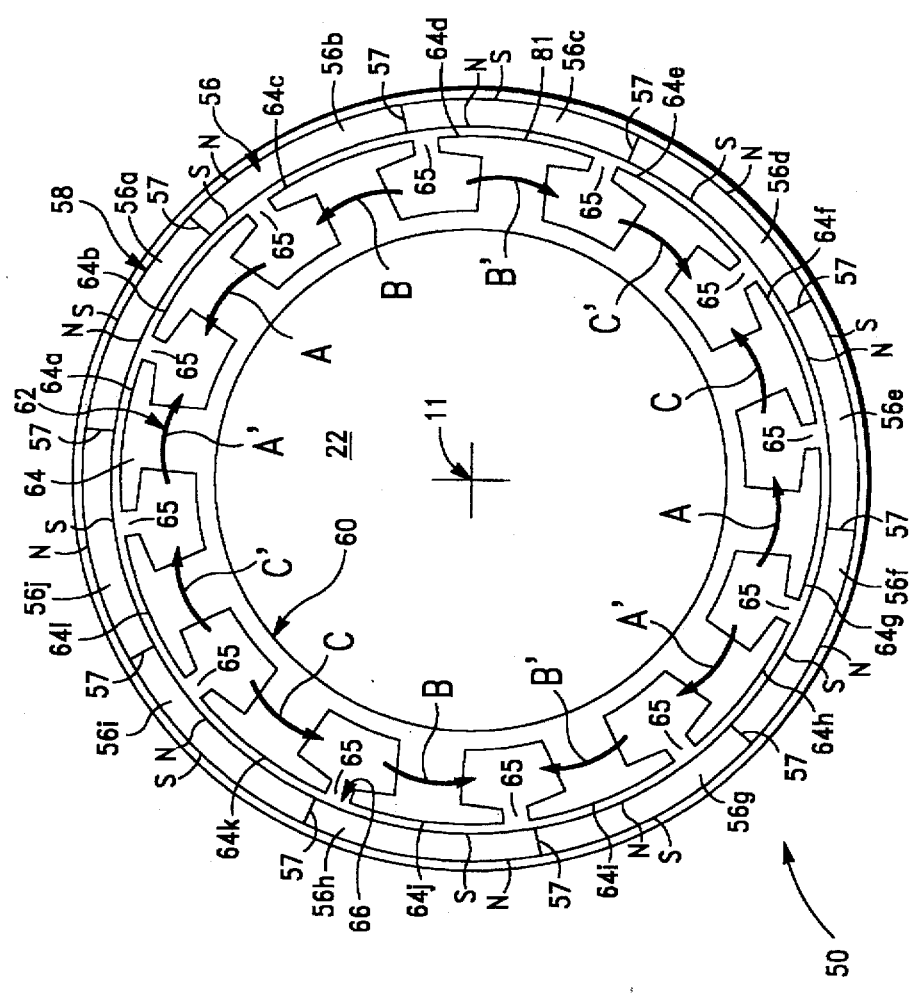
FIG. 5 is an enlarged diagrammatic view of a first preferred ten pole rotor and twelve slot stator arrangement in accordance with principles of the present invention.

Turning attention now to FIG. 5, the shaft 22 is shown symmetrically disposed about an axis of rotation 11 of the spindle assembly 14. The permanent magnet ring 56 defines ten pole segments 56a, 56b, 56c, 56d, 56e, 56f, 56g, 56h, 56i, and 56j (in a clockwise rotational sense). Pole segments 56a, 56c, 56e, 56g and 56i have north poles facing the stator core 60, while alternating pole segments 56b, 56d, 56f, 56h, and 56j have south poles facing the stator core. The stator core has twelve slots 65, which form twelve stator poles and pole faces 64a, 64b, 64c, 64d, 64e, 64f, 64g, 64h, 64i, 64j, 64k and 64l (also in a clockwise rotational sense) which adjacently confront the ten permanent magnet pole segments 56a–j, separated by the narrow magnetic gap 66. A coil 62 is wound about each stator pole 64 and occupies up to about one half of an interiorly widened portion of the two adjacent gaps 65 on each side of the coil 62.

Figure 6:
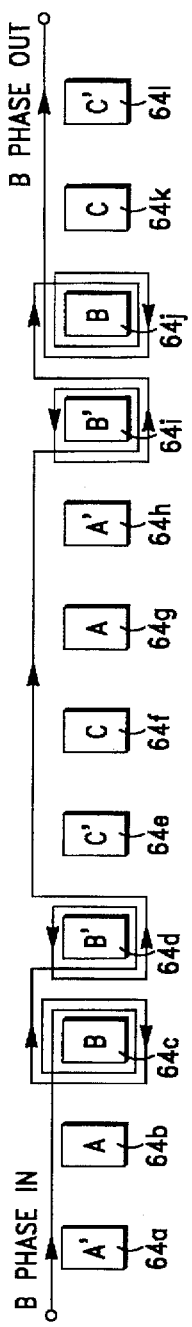
FIG. 6 is a coil winding diagram for the "B" phase of the FIG. 5 stator arrangement in accordance with a first preferred winding pattern.

In the present example, the twelve coils 62 are arranged and electrically connected into three series of four coils, there being an A phase, a B phase and a C phase. FIG. 6 sets forth an exemplary winding pattern for winding the coils 62 about the stator poles 64 as A, A', B, B', C', C, A, A', B', B, C, and C'. The prime symbol indicates e.g. a counterclockwise coil winding pattern whereas absense of a prime symbol adjacent a letter denotes e.g. a clockwise coil winding pattern for the particular coil designated by the capital letter. This particular winding pattern produces a highest efficiency or motor constant level (unity), as defined by power loss divided by resultant torque. In addition, it produces a lowest level of acoustical energy output, and therefore is the most preferred of present embodiments. Those skilled in the art will appreciate that the winding patterns could be reversed in order with equally satisfactory results. FIG. 6 sets forth a linearized depiction of the winding pattern for the B phase coils (stator poles 64c, 64d, 64i and 64j) with the understanding that the indicated winding patterns are also provided for the A and C phase coils in similarly indicated fashion.

Figure 7:
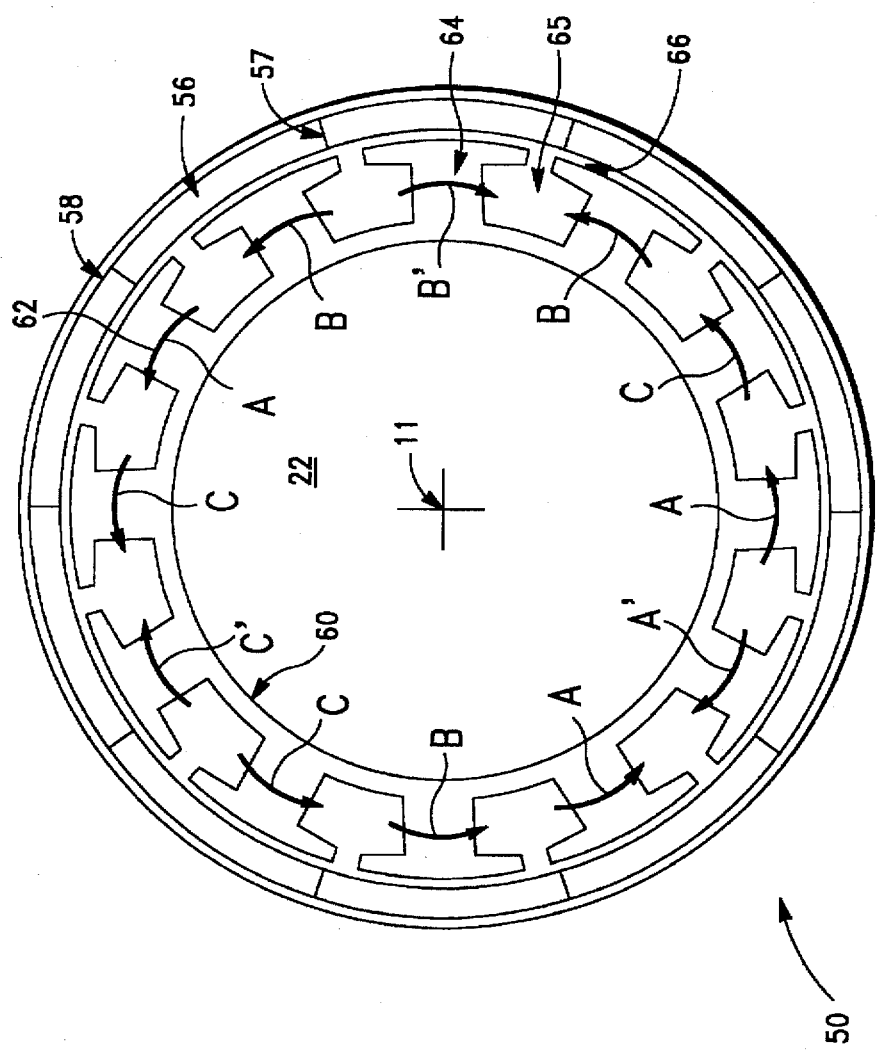
FIG. 7 is an enlarged diagrammatic view of a second preferred ten pole rotor and a twelve slot stator arrangement in accordance with principles of the present invention.
Figure 8:
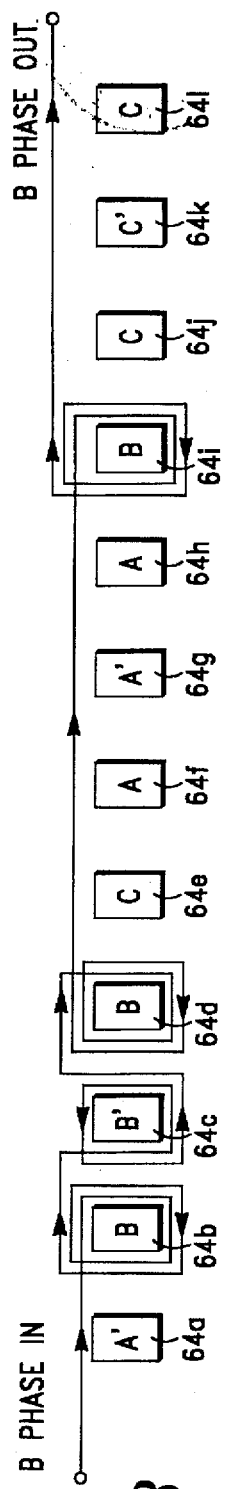
FIG. 8 is a coil winding diagram for the "B" phase of the FIG. 7 stator arrangement in accordance with a second preferred winding pattern.
Figure 9:
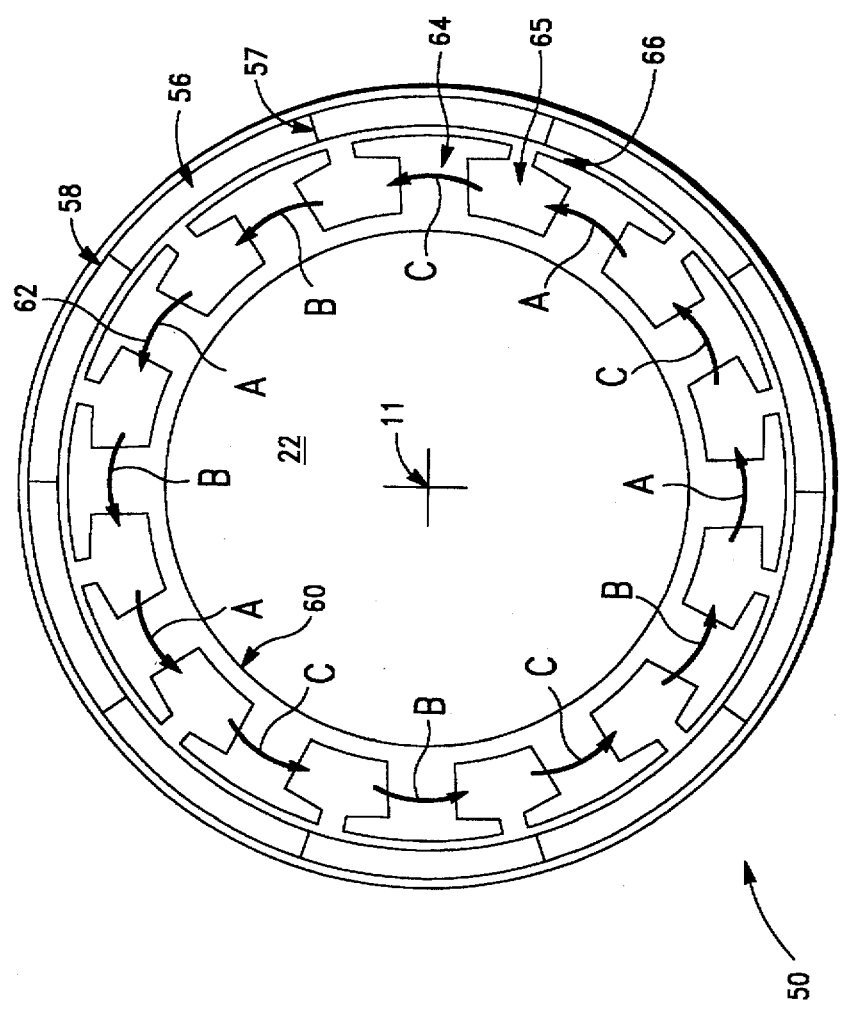
FIG. 9 is an enlarged diagrammatic view of a third preferred ten pole rotor and a twelve slot stator arrangement in accordance with principles of the present invention.
Figure 10:
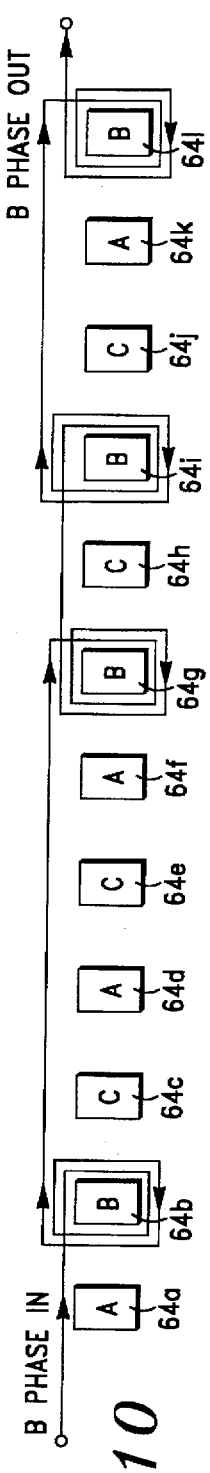
FIG. 10 is a coil winding diagram for the "B" phase of the FIG. 9 stator arrangement in accordance with a third preferred winding pattern.
Figure 11:
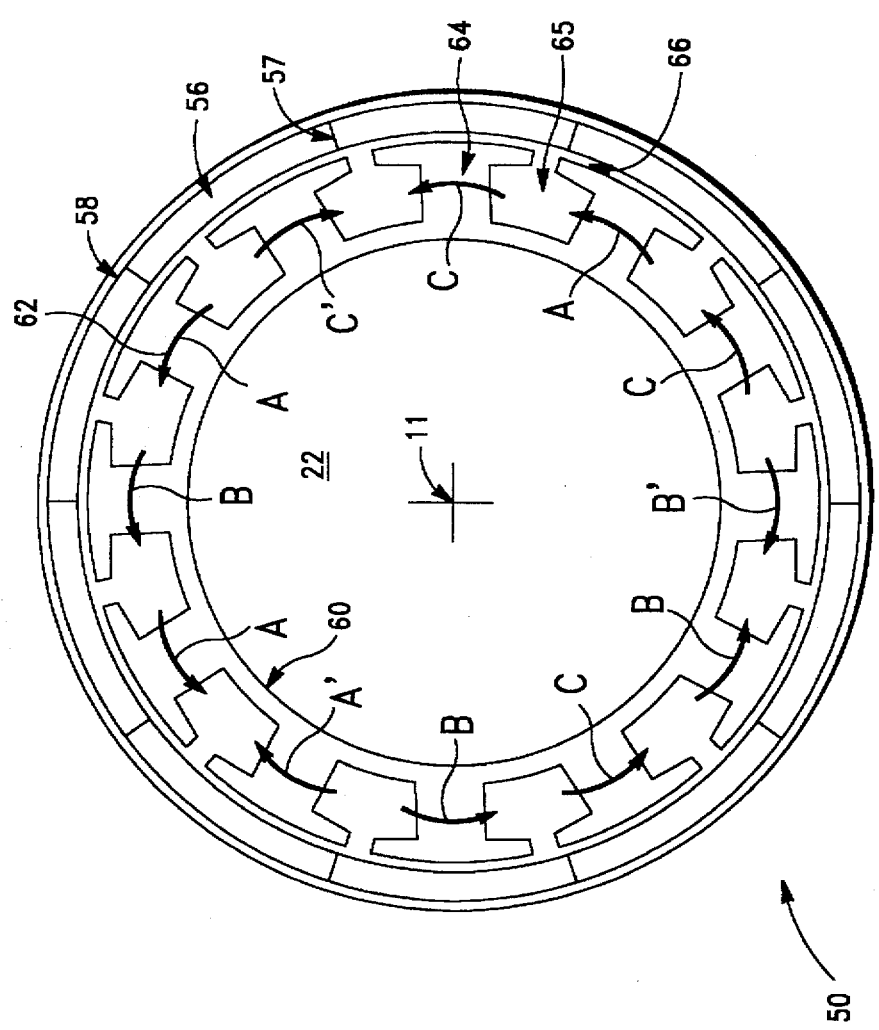
FIG. 11 is an enlarged diagrammatic plan view of a fourth preferred ten pole rotor and a twelve slot stator arrangement in accordance with principles of the present invention.
Figure 12:
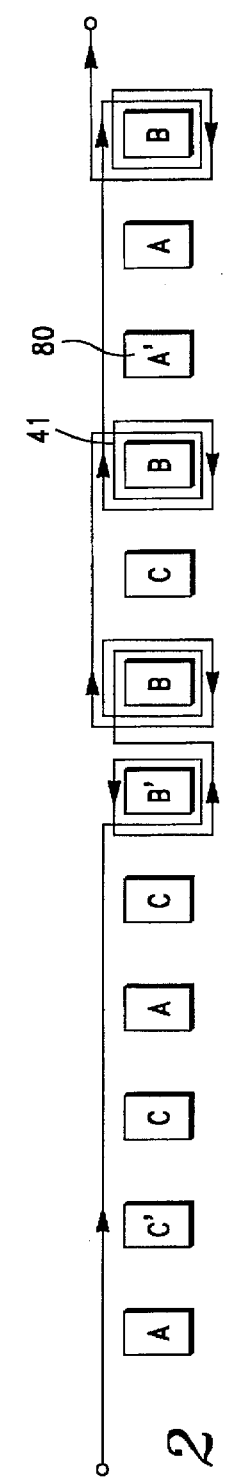
FIG. 12 is a coil winding diagram for the "B" phase of the FIG. 11 stator arrangement in accordance with a fourth preferred winding pattern.

FIGS. 7 and 8 illustrate a second preferred winding pattern, A, B, B',B, C, A, A', A, B, C, C', C, which results in slightly less efficiency (0.97) with some slight increase in acoustic energy emissions (motor noise). Similarly, the winding patterns shown in FIGS. 9 and 10, and the winding patterns shown in FIGS. 11 and 12 also have increases in acoustic energy emission as well as declining motor efficiency. The winding pattern of FIGS. 9 and 10, A, B, C, A, C, A, B, C, B, C, A, B has a motor efficiency of (0.87). The winding pattern of FIGS. 11 and 12, A, C', C, A, C, B', B, C, B, A', A, B, has a motor efficiency of (0.84).

Figure 13:
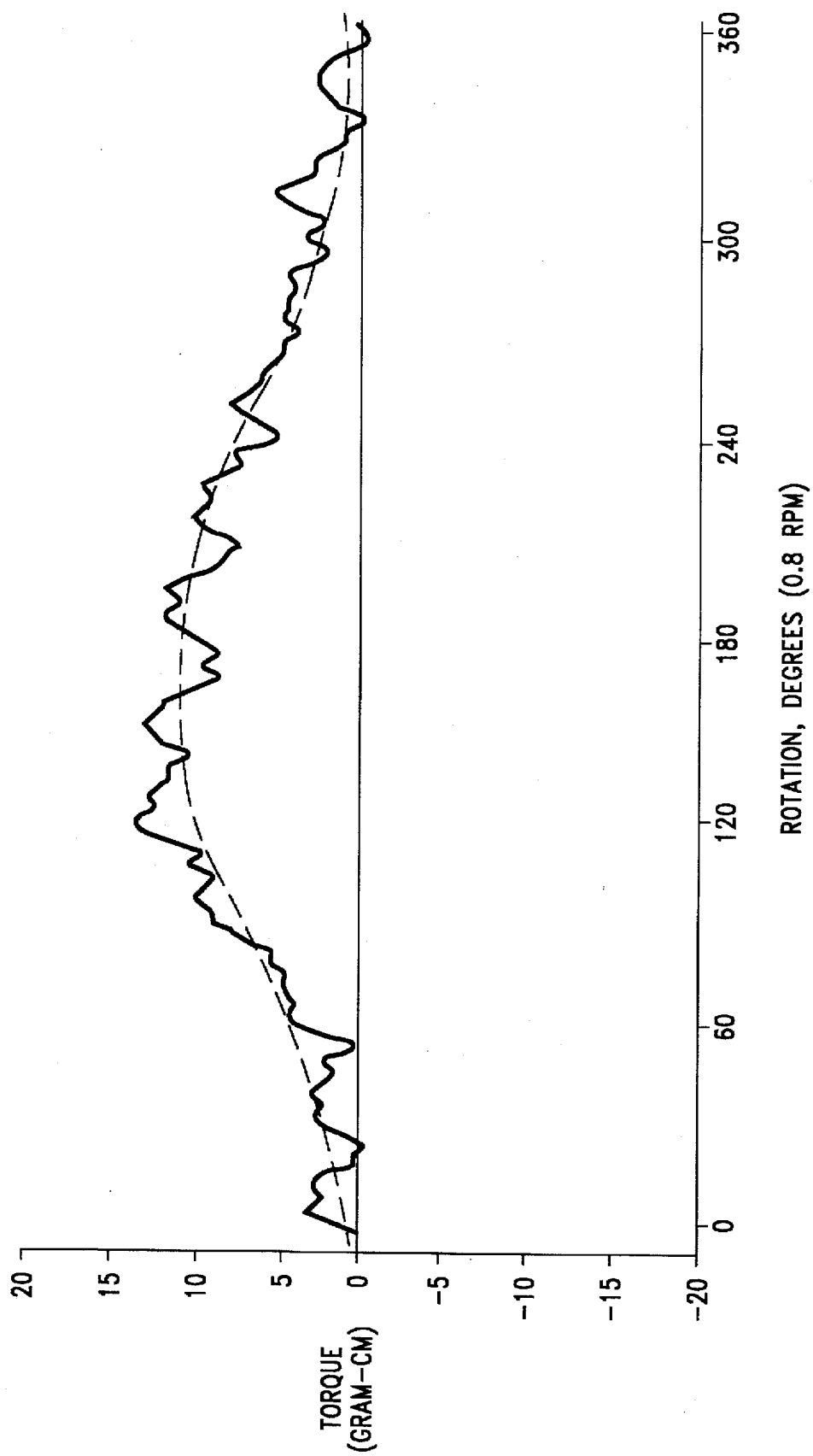
FIG. 13 is a graph of torque plotted against a single rotation of a ten pole, twelve slot disk drive spindle motor as shown in FIG. 4 showing essentially no cogging torque and substantially flattened and reduced net radial force, in accordance with principles of the present invention.

FIG. 13 presents a plot of torque as a function of angular displacement measured at a rotational rate of (0.8) revolutions per minute developed in a disk drive spindle motor having ten permanent magnet rotor poles and twelve stator slots in an arrangement similar to the one depicted in FIG. 4 discussed above. While a net radial force is shown to be present in this example because of fixturing (and is shown by a dashed line locus in FIG. 13), what is striking about the data is that when the 1 Hz fixturing offset is backed out, the net radial force is much more evenly distributed over the rotational locus of the motor under measurement.

The following table 1 presents a qualitative comparison of DC brushless motor pole-slot configurations which have been used, or which are suitable for as, disk drive spindle motors.

TABLE 1

|  | 4pole 6slot | 8pole 6slot | 8pole 9slot | 12pole 9slot | 8pole 12slot | 10pole 12slot |
| --- | --- | --- | --- | --- | --- | --- |
| detent force | high | high | low | med/high | high | low |
| radial force | low | low | high | low | low | low |

The detent torque of a permanent magnet motor has been discovered to be directly related to least common multiple (LCM) of the motor's poles and slots. In general, the higher the LCM, the lower the detent torque. The LCM describes how many detent peaks will be present over a single revolution of the motor. Returning for a minute to the FIG. 2 graph of the 12 pole, nine slot permanent magnet motor, it is apparent by inspection that the LCM for this arrangement is 36 because of the 36 well defined detent peaks.

Motor symmetry is identified if the product of the number of poles and the number of slots divided by the LCM is greater than unity. This product identifies the number of locations within the motor geometry that a particular magnetic flux interaction repeats itself. The common interactions are always evenly spread across the circumference of the motor. When the motor is being driven, the above is true also, except that the amplitudes of the net radial forces are even larger for the asymmetric designs.

The following Table 2 defines motor pole/slot combinations as symmetric or asymmetric by calculating the quotient of the product of poles and slots (P*S) divided by the LCM for the particular motor design:

TABLE 2

|  | 4pole 6slot | 8pole 6slot | 8pole 9slot | 12pole 9slot | 8pole 12slot | 10pole 12slot |
| --- | --- | --- | --- | --- | --- | --- |
| LCM | 12 | 24 | 72 | 36 | 24 | 60 |
| P*S/LCM | 2 | 2 | 1 | 3 | 4 | 2 |

Table 2 establishes that all of the pole/slot combinations other than the eight pole/me slot motor design are symmetric.

Net radial forces between the stator and rotor of a motor represent a load which the bearing system must support. If the net radial force also rotates with time, bad motor/spindle system vibration and unwanted excessive acoustic energy emission can result. If a net radial force exists, it generally also moves with time. For example, an eight pole/nine slot net radial force spins counter to rotor direction at eight times the spindle speed. A net radial force on the stator and rotor can come from two sources: the stator-to-rotor magnet attraction, and the coil current-to-magnet interactions. These forces always exist but can cancel each other out if there is geometric symmetry within the motor design.

By far, the greatest forces in a motor of the type being described are due to the magnet-to-steel attractions. They are the ones that must be canceled out first by a proper pole/slot combination. As magnets become stronger and geometric clearances become smaller with new motor designs, these forces become increased. A symmetric pole/slot ratio that has a greatest common factor greater than unity will ensure that stator-to-magnet radial attraction forces sum to zero.

Symmetric energizing of the coils will ensure zero radial force contributions from electrical commutation and can be accomplished by suitable winding patterns. The distributed winding pattern of the prior eight pole/nine slot motor having an interleaved coil connection pattern of ACABAB-CBC represented an attempt to approach symmetry at the expense of motor efficiency, over a more commonly encountered coil connection pattern of AAABBBCCC.

A prior twelve pole/nine slot DC motor with an ABC, etc., winding pattern meets all of the above requirements, but is difficult to design for low cogging torques. A ten pole/twelve slot motor in accordance with principles of the present invention satisfies the above requirements and is additionally easy to design for low cogging torques.

Figure 14:
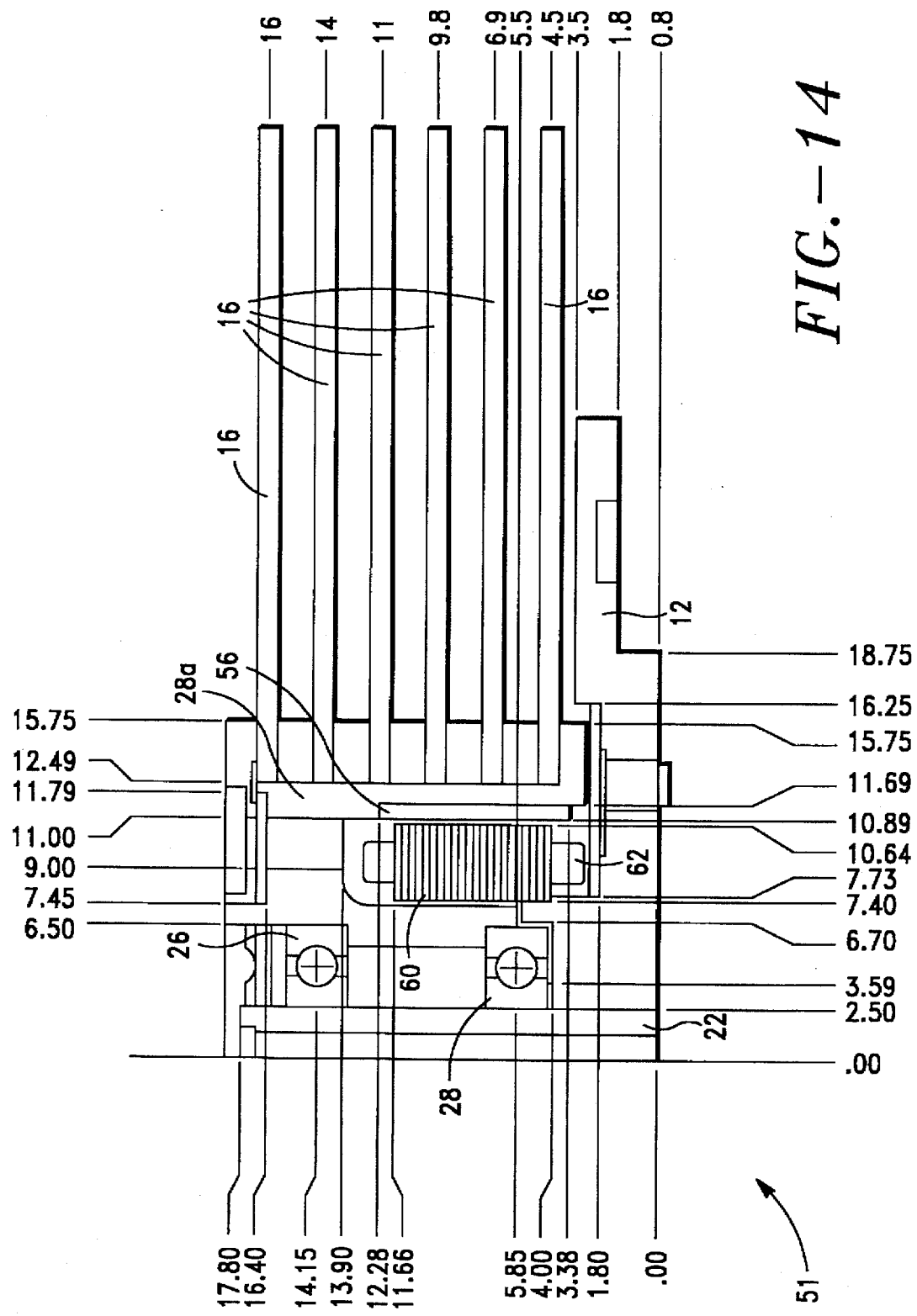
FIG. 14 is a right half view in elevation and section to scale of a symmetrical ten pole/twelve slot motor incorporating principles of the present invention and designed to operate for sustained periods at very high speed, on the order of 10,000 RPM.

FIG. 14 sets forth a physically dimensioned (in millimeters) spindle motor 51 for a disk drive spindle assembly. The motor 51 has a ten pole/twelve slot configuration in accordance with the principles of the present invention. The reference numerals applied in describing the same functional elements in FIG. 3 are also applied to corresponding elements in FIG. 14. This spindle motor 51 achieves a sustained nominal rotational speed of 10,000 RPM and is for rotating e.g. six storage disks 16, each disk having an approximate three and one half inch (95 mm) diameter in a conventional full height, 3.5 inch hard disk drive form factor. The spindle assembly uses NSK Ball Bearing Units type B5-39, 5×13×3, with bearing preload of 1.2 kilograms, and with a bearing span (center to center) of 8.31 min. Also, in this example 51 the hub 28a is formed of a ferromagnetic material, and there is no flux return ring 58.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A brushless DC motor comprising:

a base, a cylindrical rotor structure rotating relative to the base about an axis of rotation and including a rotating body journaled to the base by a bearing system and a permanent magnet ring structure carried by the rotating body and defining ten permanently magnetized alternating north-south magnet segments, a generally cylindrical stator structure including a core of ferromagnetic material secured to the base about the axis of rotation and separated inwardly of the permanent magnet ring structure by a magnetic clearance gap, the core defining twelve stator slots between twelve stator poles, a coil of insulated wire being wound around each stator pole in a predetermined winding direction, and the coils being connected into a series of three electrical driving phases, each phase including four predetermined stator coils connected in series, wherein the coils are wound and connected in accordance with one of the following connection patterns:

(i) A', A, B, B', C', C, A, A', B', B, C, C'; (ii) A, B, B', B, C, A, A', A, B, C, C', C; (iii) A, B, C, A, C, A, B, C, B, C, A, B; or (iv) A, C', C, A, C, B', B, C, B, A', A, B, where A represents a first phase, B represents a second phase and C represents a third phase, and wherein a prime character following a letter denotes a coil winding direction in opposite sense to a coil denoted by an unprimed letter.

2. The brushless DC motor set forth in claim 1 wherein the bearing system comprises a pair of spaced apart, preloaded ball bearing units.

3. The brushless DC motor set forth in claim 1 wherein the bearing system comprises a pair of spaced apart hydrodynamic journal bearings.

4. The brushless DC motor set forth in claim 3 wherein the bearing system additionally comprises a pair of axial hydrodynamic thrust bearings.

5. The brushless DC motor set forth in claim 1 within a disk drive spindle assembly and wherein the cylindrical rotor structure includes a hub, and further comprising at least one data storage disk mounted on the hub for rotation relative to the base by the brushless DC motor.

6. The brushless DC motor set forth in claim 5 further comprising a plurality of data storage disks, each having a diameter in a range between approximately 90 and 100 millimeters and wherein the brushless DC motor rotates the data storage disks at a nominal rotational speed of not less than approximately 10,000 revolutions per minute.

7. A miniature hard disk drive assembly comprising:

a base enclosure and a cover for enclosing the base enclosure thereby defining an enclosed interior space, a brushless DC motor mounted to the base and including a cylindrical rotor structure rotating relative to the base about an axis of rotation and including a disk hub journaled to the base by a bearing system and a permanent magnet ring structure carried by the disk hub and defining ten permanently magnetized alternating north-south magnet segments, and a generally cylindrical stator structure including a core of ferromagnetic material secured to the base about the axis of rotation and separated inwardly of the permanent magnet ring structure by a magnetic clearance gap, the core defining twelve stator slots between twelve stator poles, a coil of insulated wire being wound around each stator pole in a predetermined winding direction, and the coils being connected into a series of three electrical driving phases, wherein the coils are wound and connected in accordance with one of the following connection patterns:

(i) A', A, B, B', C', C, A, A', B', B, C, C'; (ii) A, B, B', B, C, A, A', A, B, C, C', C; (iii) A, B, C, A, C, A, B, C, B, C, A, B; or (iv) A, C', C, A, C, B', B, C, B, A', A, B, where A represents a first phase, B represents a second phase and C represents a third phase, and wherein a prime character following a letter denotes a coil winding direction in opposite sense to a coil denoted by an unprimed letter;

one or more data storage disks mounted to the disk hub, wherein the brushless DC motor rotates the data storage disks at a nominal rotational speed of not less than approximately 10,000 revolutions per minute, each disk having a diameter in a range between approximately 90 and 100 millimeters, the disk drive further comprising a plurality of data transducers positioned relative to the disk data storage surfaces by a data transducer-actuator assembly.

8. The miniature hard disk drive assembly set forth in claim 7 wherein the bearing system comprises a pair of spaced apart, preloaded ball bearing units.

9. The miniature hard disk drive assembly set forth in claim 7 wherein the bearing system comprises a pair of spaced apart hydrodynamic journal bearings and a pair of axial hydrodynamic thrust bearings.

* * * * *